Figure 1:
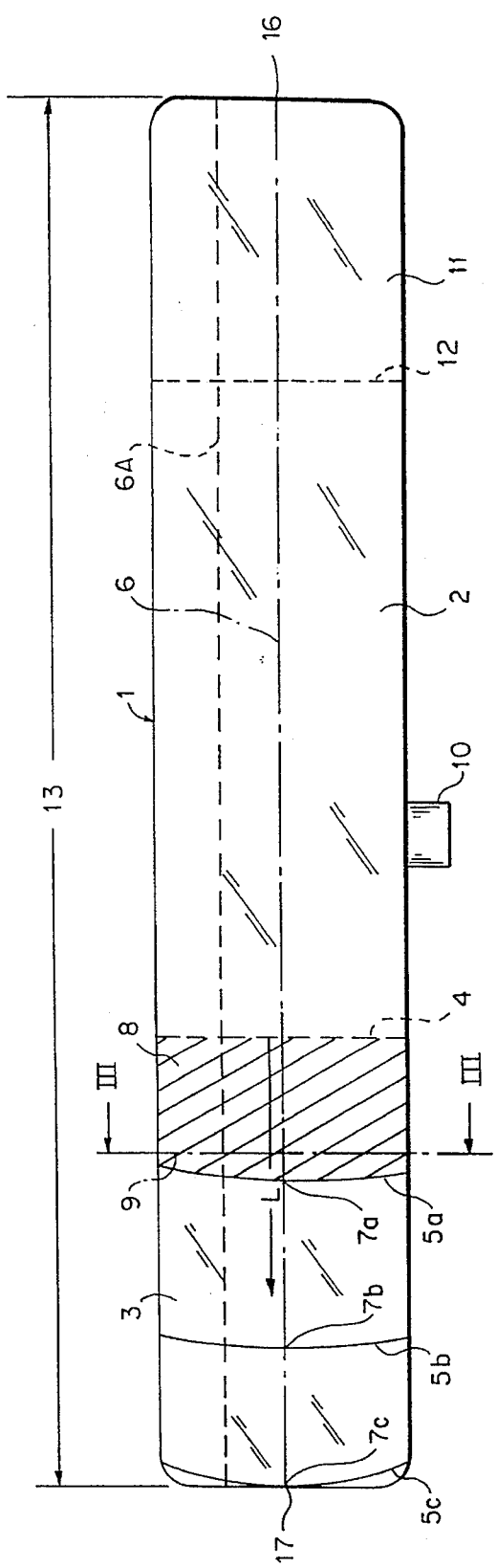

United States Patent [19]

Schlenke

[11] Patent Number: 5,621,569
[45] Date of Patent: Apr. 15, 1997

[54] REAR-VIEW MIRROR FOR VEHICLES

[76] Inventor: Hubert Schlenke, Hasenwinkel 13, D-5778 Meschede, Germany

[21] Appl. No.: 78,240

[22] PCT Filed: Sep. 17, 1991

[86] PCT No.: PCT/EP91/01764

§ 371 Date: Oct. 24, 1994

§ 102(e) Date: Oct. 24, 1994

[87] PCT Pub. No.: WO92/11147

PCT Pub. Date: Jul. 9, 1992

[30] Foreign Application Priority Data

Dec. 20, 1990 [DE] Germany .................... 40 40 839.6

[51] Int. Cl.$^6$ .................... G02B 5/08; G02B 5/10; B60R 1/04; B60R 1/08

[52] U.S. Cl. .................... 359/603; 359/604; 359/864; 359/866; 359/868

[58] Field of Search .................... 359/603, 604, 359/605, 854, 855, 864, 865, 866, 868

[56] References Cited

U.S. PATENT DOCUMENTS

| | | | |
|---|---|---|---|
| 3,764,201 | 10/1973 | Haile | 359/868 |
| 4,258,979 | 3/1981 | Mahin | 359/868 |
| 4,264,144 | 4/1981 | McCord | 359/868 |
| 4,331,382 | 5/1982 | Graff | 359/868 |
| 4,449,786 | 5/1984 | McCord | 359/868 |
| 5,005,962 | 4/1991 | Edelman | 359/866 |

FOREIGN PATENT DOCUMENTS

| | | | |
|---|---|---|---|
| 1941895 | 3/1971 | Germany | 359/868 |
| 2054396 | 5/1972 | Germany | 359/868 |
| 1279158 | 6/1972 | United Kingdom | 359/868 |

*Primary Examiner*—Ricky D. Shafer
*Attorney, Agent, or Firm*—Browdy and Neimark

[57] ABSTRACT

The invention concerns a vehicle rear-view mirror (1) comprising a plane-mirror section (2) and at least one convex section (3, 11) contiguous with the sides of the plane section. The curvature of the convex side sections is zero at the transition line (4, 12) with the plane-mirror section (2), and increases progressively with increasing arc length (L) from the transition line, the cur of vertical orthogonal lines of intersection being equal to the curvature of a horizontal reference line (6, 6A) at their point of intersection. The rear-view mirror (1) proposed enables the driver to view both behind and to the side. The mirror (1) is easy to produce since the curvature of the convex side sections (3, 11) only departs by a small amount from the plane of the plane-mirror section (2).

20 Claims, 3 Drawing Sheets

REAR-VIEW MIRROR FOR VEHICLES

The invention relates to a rear-view mirror for motor vehicles, comprising a plane-mirror section and at least one convexly curved side section contiguous with the sides of the plane-mirror section and sloping steadily, and having a curvature of zero at the transition line to the plane-mirror section, the curvature of the side section increasing progressively with increasing distance from the plane-mirror section.

A rear-view mirror of this type is known from Netherlands Patent Document NL-A-6 400 067 as an outside mirror for a vehicle. In this case the flat mirror makes a continuous changeover into a spherical mirror with a decreasing curvature radius. Because the outside mirror is disposed under the eye level of the driver and only the lateral space is perceived from the vehicle, the visual distortions of the horizontal line that result in the transitional area into the spherical mirror are tolerable. For an inside mirror disposed above the eye level of the driver and offset from it toward the vehicle center, and which also encompasses at least the viewing area behind the vehicle, double images and a severe distortion of the horizontal line result with a dimensioning of this type, leading to visual errors.

A further rear-view mirror is already known from European Patent Document 0 210 757 A 2. In this mirror it is provided that the flat mirror section changes over tangentially into the curved section, whose curvature increases suddenly at the transition line and is further increased in spiral fashion. The sudden change in curvature is disadvantageous not only for recognizability of a reflected image due to resulting double images, but also for production.

Further, inside rear-view mirrors are known from German Patent Document DE 17 55 828 A1 in which a horizontally and vertically curved side-mirror section is contiguous with a plane-mirror section. The curvature radii of the side-mirror section are intended to become smaller with increasing distance from the mirror center. Although the curvature of this side-mirror section increases outwardly, this increase in curvature takes place in steps, not in a steady manner. This steplike increase in curvature causes a transition that is noticeable as a kink, not merely at the transition line from the plane-mirror section into the side-mirror section, but at each changeover of curvature radius, thus preventing a side view adequate to fulfill safety requirements, because as the number of radius changeovers increases, an equal number of kinks that distort the reflected image and cause double images is present on the side-mirror section. An embodiment of the side mirror curvature may permit a virtually distortion-free side view for the driver if the respective difference of the curvature radii is set to be appropriately low; however, even with this determination of curvature, no seamless changeover of curvature is provided from the plane-mirror section into the curved side-mirror section, so that the rear view is impaired at least at the transition line, which has a negative overall effect on the performance capability of this rear-view mirror.

Further, inside rear-view mirrors are known from German Patent Document DE 28 49 468 A 1 in which the plane-mirror section changes over, with respect to its horizontal axis, to a convexly curved side-mirror section shaped uniformly in the manner of a shell of a cylinder, by means of which the viewing angle is enlarged by the convex curvature of the side-mirror section in comparison to the plane-mirror section. This mirror permits a side view from the vehicle, but has the disadvantage of a distorted reflection of the side viewing field because of the cylinder shell-shaped curvature. An assessment of the position of overtaking vehicles is exceedingly difficult. Moreover, there is no seamless changeover from the plane-mirror section into the curved side-mirror section, because the curvature of the side-mirror section changes suddenly at the transition line. For this reason the transition line is always perceived by the driver as a kink that causes an irregular reflected image, particularly double images. Because of the distortion of the reflected image and the kink at the transition line, the driver particularly cannot judge the position of overtaking vehicles, either sufficiently or at all, the consequence of which is a considerable reduction in safety.

Further, inside rear-view mirrors are known from German Patent Document DE 34 01 033 A 1 that permit an undistorted view through the side window by means of a combination of one main mirror and two side mirrors, which can be adjusted independently of each other to different viewing angles.

The design-related spacing between the respective individual mirrors does not permit an error-free side view, however, because the driver perceives only double images when one eye looks into the main mirror and the other eye looks into the offset side mirrors. The two eyes receive two different image signals from the angled side mirrors that can only be imprecisely assembled by the human brain into one complete image. Because of this, considerable visual perceptual errors occur that reduce safety in traffic. This rear-view mirror also causes an early onset of the decline in the seeing ability of the driver due to fatigue, because in the use of the three-part rear-view mirror he must view not only one inside mirror, but three at once.

In summary, the variations of a rear-view mirror known up to now do not adequately include the "blind spot" that lies between the direct viewing area and the side view from the curved mirror area; they only permit an unsatisfactory side view that does not meet safety requirements because of distortion or double images.

The object of the invention is to modify a mirror of the type mentioned for use as an inside rear-view mirror, wherein it is intended to be ensured that the area of the front side window on the driver side is also included visually without leaving a "blind spot," and that the spatially curved area of the rear-view mirror offers an assessable reflection, free from double images, of vehicles to the side with respect to the position of the driver's own vehicle.

The object is attained in that the rear-view mirror is an inside rear-view mirror, that the lines of intersection of orthogonal planes of the side-mirror section are circles whose curvature corresponds respectively to the curvature of a horizontal line of reference on the side-mirror section in their point of intersection with the circles, that the curvature of the side-mirror section increases in the manner of a clothoid spiral in linear fashion with the arc length on the horizontal line of reference on the side-mirror section, that the curvature of the clothoid spiral defining the curvature of the side-mirror section on the driver's side has a clothoid parameter A between 100 mm and 200 mm, and that the horizontal line of reference extends in the center or above the center of the mirror center, approximately at the height of an apparent horizontal line for the normal viewer.

The arc of the curve in accordance with the invention is distinguished in that the convex curvature of orthogonal lines of intersection of the side-mirror section surface corresponds to the curvature of a horzontal line of reference on the side-mirror section at the respective points of intersection.

A reflection of the objects to the side of the driver's own vehicle, particularly overtaking vehicles, that overcomes the previous "blind spot" and is for the most part free from distortion, is attained by means of the progressively increasing arc of the curve of the side-mirror section of the invention. Because of the reducing effect that occurs due the steady, progressive decrease of the curvature radii toward the mirror end, the enlargement due to the approach of an overtaking vehicle is nearly compensated. By means of this compensation, a vehicle passing to the side can be visually discerned in the best possible manner, compared with conventional plane mirrors, because the apparent speed at which the vehicle in the reflected image passes is reduced to a more discernible rate. The continuous change in the curvature from the plane-mirror section to the side-mirror section permits a spatial detection by both eyes of viewed objects.

It has proven to be particularly advantageous to set the horizontal line of reference approximately at the height of a horizontal line visible to the normal viewer, that is, above the horizontal center of the mirror, because the normal viewer always selected the basic position in such a way that the road is reflected by the largest part of the mirror surface.

The arc of the curve of the horizontal curvature of the mirror surface is embodied as a clothoid spiral. The curvature law $1/R = C \times L$, where $C = A^2$, is a result of the requirement that the curvature of the mirror surface is to increase in linear fashion with the arc length. In this equation A is the so-called clothoid parameter.

The transition from the plane-mirror section into the curved side-mirror section is likewise effected according to the law of clothoid spirals. The result is a continuous transition from $R=\infty$ to $R=x$, the radius that extends over the arc length. It has proven to be sufficient to bridge the previous "blind spot" on the driver's side when the clothoid spiral progress has a parameter of A=100 mm to 200 mm and is embodied as extending to an end radius of R=100 mm to R=300 mm.

Special features of the rear-view mirror are characterized in the dependent claims.

The lengths of the plane-mirror section and the side-mirror section are at a ratio of approximately 2:1, and the side-mirror section has a length of 8 to 15 cm, preferably 12 cm.

It has proven to be particularly advantageous that the progress of the clothoid has a clothoid parameter A of 130 mm. The curved surface that normally results from this departs only slightly in the back from the plane of the planar mirror section. This slight divergence is not only visually advantageous, but also greatly simplifies the manufacturing process of the rear-view mirror. Because of the stepless transition in curvature, the curved area can be produced simply and without optical errors through hot bending of flat glass. The mathematical definition of the curved surface allows the curved shape to be produced very simply by means of a program-controlled, automated machine.

The inside rear mirror with the side-mirror section curvature of the invention is also suited for eliminating the previous "blind spot" on the passenger side if an appropriately sized, curved side-mirror section is also contiguous with the plane-mirror section on this side.

With proper sizing, the plane-mirror section on the passenger side can be correspondingly shortened so that a curved side-mirror section can also be received on this side of the plane-mirror section. The result of this is an enlargement of the rear-view angle toward the passenger side as well, without it being necessary to enlarge the rear-view mirror overall.

In an advantageous embodiment, the area contiguous with the plane-mirror section is torqued such that the upper mirror edge is drawn further into the vehicle interior than the lower mirror edge. The torsion begins at the transition line of the plane-mirror section to the side-mirror section and extends over approximately ¼ of the side-mirror section. The resulting tilt angle of 3° to 9° is maintained from the end of the torsion to the outer edge of the mirror.

The side-mirror section rotated downwardly around the horizontal line of reference reflects the left side of the road at approximately the height of the line of reference. Because of this, the basic position of the rear-view mirror inside the vehicle can be adjusted for optimum viewing to the side and rear. Because of the torsion, the adjusting tilt-lever dimming device provided for the plane mirror can be operated when the plane-mirror section and respective side-mirror section are connected in one piece; this does not impede the function of the respective side-mirror section.

It has proven to be particularly advantageous to set the horizontal line of reference approximately at the height of a horizontal line visible to the normal viewer, that is, above the horizontal center of the mirror, because the normal viewer always selects the basic position in such a way that the road is reflected by the largest part of the mirror surface. Torsion can be omitted with this embodiment.

It is proposed as a particular embodiment of the invention that a hinge be provided between the plane-mirror section and the side-mirror section, by means of which the plane-mirror section is dimmed by the known tilt-lever device and the side-mirror section is dimmed by means of an anti-glare coating. The plane mirror adjusted for dimming is also contiguous directly and without changes in curvature or slope with the curved side-mirror section.

Figure 2:
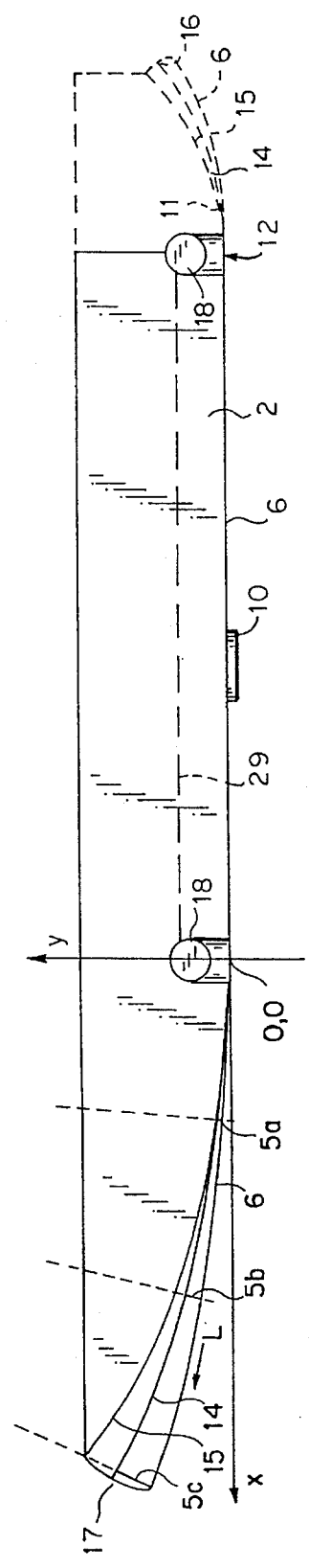
Figure 3:
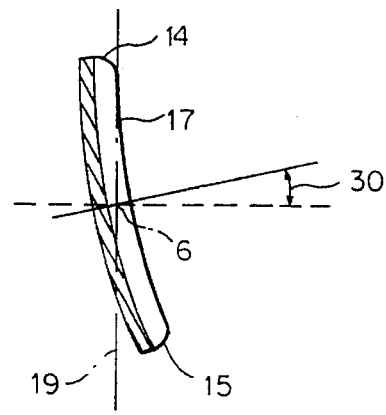
Figure 4:
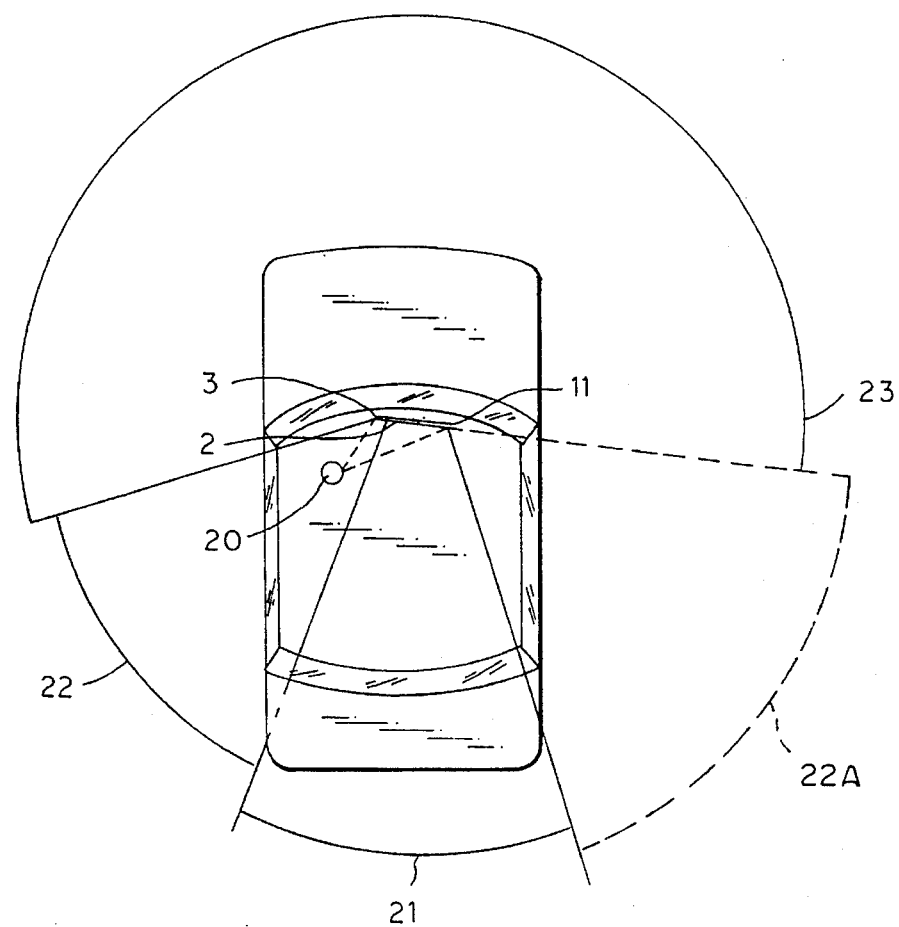
Figure 5:
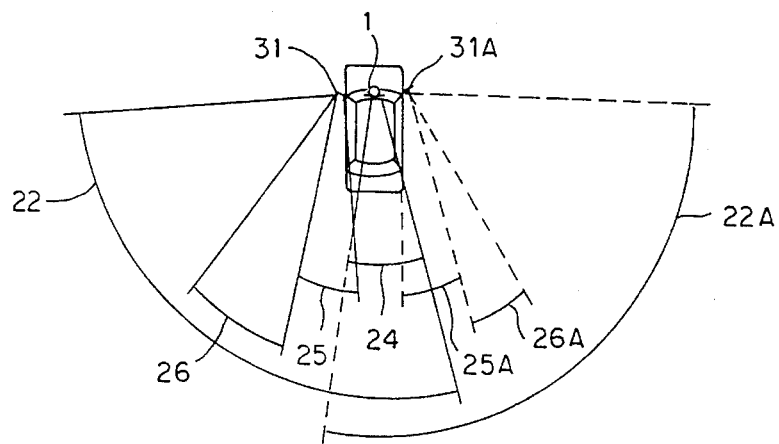
Figure 6:
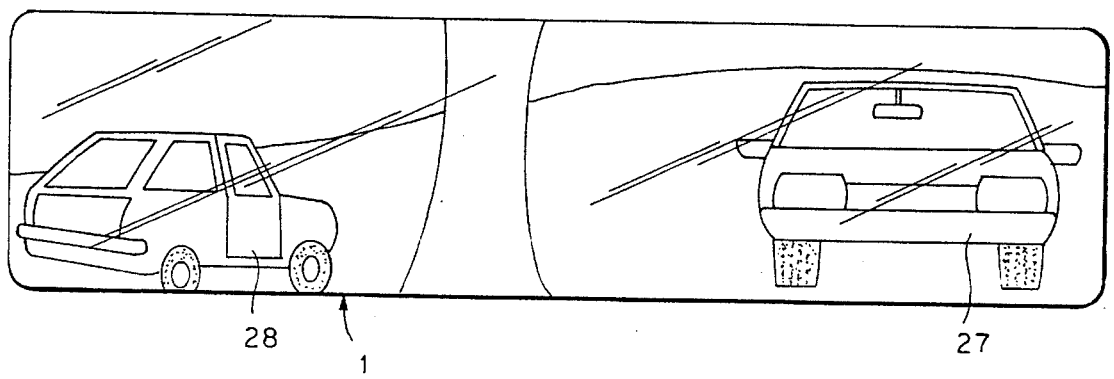

The invention is explained in detail below by means of an exemplary embodiment. The drawings show in:

FIG. 1: a schematic front view of the rear-view mirror;

FIG. 2: the rear-view mirror surface in a view from above;

FIG. 3: a cross-section of the side-mirror section (III—III), seen from the torsion end line in the direction toward the left end of the mirror;

FIG. 4: a schematic view of the sight angle seen by a normal driver through the rear-view mirror;

FIG. 5: a schematic view of the view of the driver through the rear-view mirror of a vehicle to the rear and a vehicle in the previous "blind spot" to the left, next to the driver; and FIG. 6: a schematic view of the sight angle seen in the rear-view mirror, in comparison to commercial rear-view mirrors.

FIG. 1 shows the rear-view mirror (1) schematically in a front view. The mirror comprises a plane-mirror section (2) extending from the right end of the rear-view mirror (16) to the transition line (4) and a convexly curved side-mirror section (3) contiguous with it and extending from the transition line (4) to the left end of the mirror (17). The plane-mirror section (2) comprises approximately ⅔ of the total length of the mirror (13), and the side-mirror section (3) comprises approximately ⅓ of the total mirror length.

The horizontal line of reference (6) in the exemplary embodiment extends through the center of the rear-view mirror (1) in the form of a clothoid spiral with the parameter A=130 mm. The convex curvature of the horizontal line of reference (6) increases progressively with an increasing arc length (L) toward the left end of the rear-view mirror (17).

In the side-mirror section (3), lines of intersection of planes of intersection (5a–5c) that are orthogonal to the line of reference (6) are drawn by way of example; their curvature corresponds to the curvature of the horizontal line of reference (6) at their points of intersection (7a–7c). The horizontal and vertical curvature radii of these points of intersection (7a–7c) chosen by way of example can be seen from the following table, according to the formula $R=A^2$:L with a clothoid parameter of A=130 mm.

| Point of Intersection | Arc Length (L) (in mm) | Curvature Radius (R) (in mm) |
| --- | --- | --- |
| (7a) | 40 | 338 |
| (7b) | 80 | 211.25 |
| (7c) | 120 | 140.833 |

The coordinates (x, y) of the horizontal line of reference (6) are determined for the clothoid parameter A=1, i.e., in normal form, by the respective arc length (L) according to the following equations:

$$x = \int_0^L \cos L^2/2 \cdot dL; \quad y = \int_0^L \sin L^2/2 \cdot dL.$$

A torsion section, for instance, is embodied between the transition line (4) and a vertical torsion end line (9).

Instead of the arrangement of the horizontal clothoid line of reference (6) in the center of the mirror, in another embodiment the clothoid line of reference (6A) is provided approximately at the height of the apparent horizontal image in the rear-view mirror (1), that is, above the center. This permits a better downward view to the side, and two-wheeled vehicles being driven very closely to the vehicle can be well seen. The torsion section (8) can thus be omitted, because it has a similar effect.

Further, a dimming tilt-lever (10) is shown schematically with which at least the plane-mirror section (2) can be adjusted to be free from glare.

In the right area of the rear-view mirror, a further side-mirror section (11) can optionally be provided that is curved in the manner of a clothoid spiral and extending from the vertical transition line (12) such that the right side window area can be seen. The clothoid parameter A is larger than on the curved side-mirror section (3) on the driver's side because of the different viewing angles.

FIG. 2 shows the mirror surface of the exemplary embodiment in a top view. The side-mirror section (3), which becomes more sharply curved with increasing arc length (L), is contiguous at the transition line (4) with the plane-mirror section (2). At the transition line (4) the coordinates (x, y) of the horizontal line of reference (6, 6A) equal zero. The upper mirror edge (14) of the side-mirror section (3) points away from the viewer to a lesser extent than the lower mirror edge (15) because of the torsion or upward displacement of the horizontal line of reference (6).

The optional right side-mirror section (11) shown in dashed lines has a smaller lateral extension and more severe curvature than the left side-mirror section (3).

Hinges (18, 18A) are shown on the back side of the mirror, at the transition lines (4, 12), by means of which the dimming of the plane-mirror section (2) around the dimming tilt axis (29) is possible without an effect of the adjustment angle of the side-mirror sections (3, 11).

FIG. 3 shows a cross-section of the side-mirror section (3), seen from the torsion end line (9) in the direction toward the left mirror end (17). The upper mirror edge (14) is rotated toward the vehicle interior around the horizontal line of reference (6), while the lower mirror edge (15) is rotated away from the vehicle interior around the horizontal line of reference (6). The torsion is illustrated in comparison to a vertical line of reference (19). The angle of torsion (30) of the exemplary embodiment is 3°–9° with respect to the vertical line of reference (19).

FIG. 4 shows the viewing angle (21) perceived through the plane-mirror section (2) from the position of a normal driver (20) and the viewing angle (22) perceived through the side-mirror section (3, 11). It can be seen that the viewing angle (22) perceived from the side-mirror section (3) directly adjoins the direct viewing angle (23), thus eliminating the previous "blind spot."

The right side viewing angle (22A) shown in dashed lines results when the right curved side-mirror section (3) is provided. This section also allows detection of two-wheeled vehicles, in particular, that are driving closely next to the vehicle.

FIG. 5 clearly shows the viewing angle (22, 22A) of a normal driver that is expanded by the rear-view mirror (1), in comparison to the inside plane-mirror viewing angle (24), and the outside mirror viewing angle (25, 25A) and outside side-angle view (26, 26A) that can be perceived through standard outside mirrors (31, 31A). The wide-angle mirror encompasses a smaller area than the part of the inside mirror curved in accordance with the invention because of its disadvantageous position with respect to the viewer.

FIG. 6 shows how the normal driver sees a vehicle (27) behind him and a vehicle (28) next to him in the rear-view mirror (1). An approximately parallel course of perspective lines and a nearly constant size of the apparent images result from the progressively increasing reduction of approaching objects.

I claim:

1. A rear-view mirror (1) for vehicles, comprising a plane-mirror section (2) and at least one convexly curved side section (3, 11) contiguous with the sides of the plane-mirror section and sloping steadily, and having a curvature of zero at the transition line (4, 12) into the plane-mirror section (2), the curvature of the side section continuously increasing progressively with increasing distance from the plane-mirror section (2), characterized in that the rear-view mirror (1) is an inside rear-view mirror, that the lines of intersection of orthogonal planes of the side-mirror section (3, 11) are circles whose curvature corresponds respectively to the curvature of a horizontal line of reference (6, 6A) on the side-mirror section in their point of intersection with the circles, that the curvature of the side-mirror section (3, 11) increases in the manner of a clothoid spiral in linear fashion with the arc length (L) on the horizontal line of reference (6, 6A) on the side-mirror section (3, 11), that the curvature of the clothoid spiral defining the curvature of the side-mirror section (3) on a driver's side has a clothoid parameter A between 100 mm and 200 mm, and that the horizontal line of reference (6, 6A) extends in the center or above the center of the mirror center, approximately at the height of an apparent horizontal line (6A) for a normal viewer.

2. The rear-view mirror as defined by claim 1, characterized in that the clothoid spiral has a clothoid parameter of A=130 mm.

3. The rear-view mirror as defined by claim 2, characterized in that a torsion section (8) of the curved side-mirror section (3) that is defined by the transition line (4) and a vertical torsion end line (9) is oriented downward by approximately 3° to 9° around the horizontal line of reference (6) extending through the torsion section, and that the torsion section (8) is disposed to extend over approximately ¼ of the curved side-mirror section (3).

4. The rear-view mirror as defined by claim 1, characterized in that a torsion section (8) of the curved side-mirror section (3) that is defined by the transition line (4) and a vertical torsion end line (9) is oriented downward by approximately 3° to 9° around the horizontal line of reference (6) extending through the torsion section, and that the torsion section (8) is disposed to extend over approximately ¼ of the curved side-mirror section (3).

5. The rear-view mirror as defined by claim 4, characterized in that the lengths of the plane mirror section (2) and the side-mirror section (3) are in a ratio of approximately 2:1, and that the length of the side-mirror section (3) is approximately 8 to 15 cm.

6. The rear-view mirror as defined by claim 5, characterized in that the length of the side-mirror section (3) is approximately 12 cm.

7. The rear-view mirror as defined by claim 4, characterized in that the rear-view mirror (1) is embodied in one piece.

8. The rear-view mirror as defined by claim 7, characterized in that at least the plane-mirror section (2) is adjustable by means of dimming tilt-lever (10).

9. The rear-view mirror as defined by claim 8, characterized in that a hinge (18) is disposed between the plane-mirror section (2) and the side-mirror section (3, 11).

10. The rear-view mirror as defined by claim 9, characterized in that the side-mirror section (23, 11) is provided with an anti-glare coating.

11. The rear-view mirror as defined by claim 9, characterized in that the clothoid spiral defining the curvature of the side-mirror section (11) disposed on a passenger's side has a larger clothoid parameter A than the clothoid spiral defining the curvature of the side-mirror section (3) on the driver's side.

12. The rear-view mirror as define by claim 9, characterized in that the side-mirror section (3, 11) is produced by means of hot bending of a flat glass plate.

13. The rear-view mirror as defined by claim 1, characterized in that the lengths of the plane-mirror section (2) and the side-mirror section (3) are in a ratio of approximately 2:1, and that the length of the side-mirror section (3) is approximately 8 to 15 cm.

14. The rear-view mirror as defined by claim 13, characterized in that the length of the side-mirror section (3) is approximately 12 cm.

15. The rear-view mirror as defined by claim 1, characterized in that the rear-view mirror (1) is embodied in one piece.

16. The rear-view mirror as defined by claim 1, characterized in that at least the plane-mirror section (2) is adjustable by means of a dimming tilt-lever (10).

17. The rear-view mirror as defined by claim 1, characterized in that a hinge (18) is disposed between the plane-mirror section (2) and the side-mirror section (3, 11).

18. The rear-view mirror as defined by claim 1, characterized in that the side-mirror section (3, 11) is provided with an anti-glare coating.

19. The rear-view mirror as defined by claim 1, characterized in that the clothoid spiral defining the curvature of the side-mirror section (11) disposed on a passenger's side has a larger clothoid parameter A than the clothoid spiral defining the curvature of the side-mirror section (3) on the driver's side.

20. The rear-view mirror as defined by claim 1, characterized in that the side-mirror section (3, 11) is produced by means of hot bending of a flat glass plate.

* * * * *